United States Patent [19]

Maasola

[11] Patent Number: 4,772,497
[45] Date of Patent: Sep. 20, 1988

[54] STRONG STEAM-STERILIZABLE MULTIPLE-LAYER FILM, AND PACKAGES FOR PHYSIOLOGIC SOLUTIONS, MADE THEREFROM

[75] Inventor: Hannu O. Maasola, Villähde, Finland

[73] Assignee: Wihuri Oy, Finland

[21] Appl. No.: 911,565

[22] Filed: Sep. 25, 1986

[30] Foreign Application Priority Data

Sep. 25, 1985 [FI] Finland .................................. 853687

[51] Int. Cl.⁴ ........................ B65D 11/00; B32B 27/08
[52] U.S. Cl. .................................. 428/35; 428/476.3; 428/476.9; 428/483; 428/520; 428/522
[58] Field of Search ...................... 428/483, 35, 476.3, 428/476.9, 519, 522; 604/408

[56] References Cited

U.S. PATENT DOCUMENTS 4,561,110 12/1985 Herbert .............................. 604/408
4,654,240 3/1987 Johnston ............................ 428/483

FOREIGN PATENT DOCUMENTS 35778 4/1978 Japan .................................... 428/483
160487 12/1979 Japan .................................... 428/483
57-28777 2/1982 Japan .
564184 7/1977 U.S.S.R. .............................. 428/483
7920765 6/1979 United Kingdom .
8319164 7/1983 United Kingdom .

Primary Examiner—Edith Buffalow
Attorney, Agent, or Firm—Biebel, French & Nauman

[57] ABSTRACT

The invention relates to a strong and steam-sterilizable multiple-layer plastic film for packaging physiologic solutions, and to a strong and sterilizable package, made of this film, for physiologic solutions. Since the conventional plastics used for packaging physiologic solutions turn brittle under steam-sterilization, a new type of multiple-layer film has been invented which has, especially after steam-sterilization, mechanical properties superior to those of a conventional plastic film. The film according to the invention is produced in such a way that at least one layer is a mixture of polyolefin, preferably polypropylene, and an elastomer. In this manner the resistance to flex crack formation can be improved about 10-fold.

17 Claims, 4 Drawing Sheets

STRONG STEAM-STERILIZABLE MULTIPLE-LAYER FILM, AND PACKAGES FOR PHYSIOLOGIC SOLUTIONS, MADE THEREFROM

The invention relates to a steam-sterilizable multiple-layer plastic film to be used for packaging physiologic solutions, and a strong and sterilizable package, made therefrom, for physiologic solutions.

Plastic bags for packaging physiologic solutions are well known in the medical field. They are usable whenever transparent and flexible packages, such as infusion-solution bags and blood bags, are needed. The plastic bags intended for packaging physiologic solutions must be inexpensive and easy to manufacture, must not react with the components of physiologic solutions, and must not yield their additives into physiologic solutions. Their permeability to water-vapor, air and other gases must be low, their resistance to heat must be high since they are subjected to steam sterilization at 100°–120° C., they must be easy to heat seal, and they must withstand mechanical stresses caused by the surroundings.

The only plastic material fulfilling these requirements has so far been soft polyvinyl chloride, i.e. PVC (see, for example U.S. Pat. No. 4,507,123), in other words PVC which contains a considerable proportion of softeners, which, being small-molecule compounds, may readily diffuse from the polymer into the physiologic solution. It has been observed that a patient who has for a prolonged period been treated with an infusion solution packed in a PVC bag has absorbed a few grams of softener, which may result in a permanent hazard to the patient's health.

An infusion-solution bag made of soft PVC is susceptible to the decomposing action of atmospheric oxygen and to attacks by micro-organisms, in which case they specifically dissolve the softeners and thereby destroy the bag.

Attempts have been made to eliminate these disadvantages by, for example, inventing new packaging materials for physiologic solutions. A mixture of PVC and polyurethane, polybutadiene, polyacrylic nitrile and ethylene-vinyl acetate copolymer, which are mentioned in U.S. Pat. No. 4,453,940, are some of such materials. U.S. Pat. No. 4,410,162 describes a mixture of polyolefin substantially containing propylene units, a segment copolymer and possibly a softener, and U.S. Pat. No. 4,516,977 discloses as a packaging material a polyolefin to which some amount of some other polymer has possibly been added and which is preferably coated with a layer of polyamide, PVC, polyvinylidene chloride, polyvinyl fluoride, polytrifluorochloroethylene or polyester. FI Patent Application No. 84 0092 describes as a sterilizable film material a polyether-ester amide segment polymer, which may also be present in a multiple-layer film in lamination with, for example, a layer of polyolefin, polyester, polyamide, polyvinyl alcohol, ethylene-vinyl acetate elastomer, cellulose acetate, or polyvinylidene chloride.

Attempts have also been made to diminish the hazards involved in the use of PVC bags by protecting the bag by means of an outer package, which may be another bag or a package made by using a deep-drawing machine, in which either the lower sheet or both the upper and lower sheets are formed into a cup shape. In addition to the above-mentioned requirements set for the inner package, the outer package must be mechanically very strong and capable of protecting the PVC package from, for example, the action of atmospheric oxygen and micro-organisms.

The properties required of the outer package have best been achieved by preparing a multiple-layer film in which the properties of the materials in the different layers supplement one another. Thus the film layer which is of polyester (e.g. polyethylene or polybutylene phthalate) or polyamide (e.g. PA6 or PA66) has a high resistance to heat, a tolerably low permeability to oxygen and nitrogen, and high strength, whereas the layer made of polypropylene can be heat-sealed, is softer, and has a low permeability to moisture. Multiple-layer films of the following types, among others, known in the art, have so far been used as outer packages for physiologic solutions.

TABLE 1

| Layer 1/layer 2 | Thickness of layer 1/thickness of layer 2, μm |
|---|---|
| PA/PP | 20/75 |
| PA/PP | 50/75 |
| PA/PP | 80/100 |
| polyester/PP | 30/75 |
| polyester/PP | 12/75 |
| co-PP/PP | 50/100 |

PA = polyamide
PP = polypropylene
co-PP = copolymer of polypropylene

Also known in the art are multiple-layer films suitable for outer packages, with one layer of polypropylene copolymer and the other layer of polypropylene.

These packages alternatives in accordance with the state of the art, by means of which endeavors have been made to replace PVC as a packaging material or to reduce the hazards of PVC with the aid of an outer package, have, however, their own disadvantages. The materials replacing PVC are often expensive special-purpose plastics, or they have properties inferior to those of PVC, and therefore they have not been capable of replacing PVC as a packaging material for physiologic solutions. The polypropylene used as an outer packaging material crystallizes during sterilization and loses some of its elastic properties. When polypropylene is one of the layers in multiple-layer films, the result obtained after steam-sterilization is a package which is unsatisfactory with respect to its mechanical properties, cracking easily when flexed (poor flex crack resistance).

Therefore the problem of the present invention is to provide a film which is suitable for replacing the inner and/or outer packages so far used for physiologic solutions. Such a film must be stable and capable of being steam-sterilized at a temperature of at least 120° C., and it must even after steam-sterilization retain its good mechanical properties.

According to the invention, this problem has been solved by means of a multiple-layer film according to the characterization part of claim 1. According to the invention, by using the multiple-layer film a physiologic-solution package is obtained which is inexpensive and easy to manufacture, and in which stability, heat-sterilizability, heat-sealability, impermeability to air and water vapor, and good mechanical properties are combined.

It has surprisingly been observed that by preparing one of the layers of the multiple-layer film of a mixture of polyolefin and an elastomer, which contains substantially elastomer, a physiologic-solution package having the above-mentioned properties is obtained, a package which retains its mechanical properties also after heat-sterilization. This layer, which is preferably made up of polypropylene and an elastomer, does not crystallize as easily during sterilization as does pure polypropylene, and so it retains the strength of the multiple-layer film in spite of heat-sterilization treatment. The elastomer can be any elastomer miscible with polyolefin, for example ethylene-vinyl acetate elastomer. FIG. 1 shows diagrammatically the dependence of heat resistance (softening point) and toughness (flex crack resistance) on the composition of the polypropylene-elastomer mixture layer. Since an increase of the elastomer proportion increases the toughness of the multiple-layer film but reduces its resistance to heat, the mixture works within a range of 10–60% by weight elastomer, and best within a range of 20–50% by weight elastomer.

This inventional idea can be applied either by preparing a new inner package for physiologic solutions, whereby, in the optimal case, the outer package is rendered unnecessary, or by preparing a new outer package for physiologic solutions. Also the units through which the package is filled and discharged may advantageously contain this mixture of polyolefin and elastomer according to the invention.

The inner layer, i.e. the heat-sealed layer of the multiple-layer film used for the inner package for physiologic solutions can be, for example polyolefin, preferably linear polyethylene or the said mixture of polyolefin, preferably polypropylene, and an elastomer. The outermost layer is, for example, a more heat-resistant mixture of polyolefin, preferably polypropylene, and an elastomer, or a heat-resistant plastic such as a polyester.

The heat-resistant and gas impermeable layer used in the multiple-layer film used for an outer package for physiologic solutions can be polyester, polyamide or some other heat-resistant and gas impermeable plastic suitable for a film. Since polyamide is a hygroscopic material which during steam-sterilization may crystallize, thereby turning hazy and brittle, polyester is the plastic of preference for this purpose. In a multiple-layer film according to the invention, intended for the outer package, it is also possible to use a polyolefin layer, which is preferably polypropylene or linear polyethylene. The advantageousness of polypropylene is based on its good adherence to a polymer-elastomer mixture, in which case no adhesive is needed between the layers.

The multiple-layer film can be prepared, for example, by laminating the individual layers together by using an adhesive, by preparing it directly by a coextrusion blowing technique, by a flat coextrusion method, or by a coating technique. These are conventional methods of manufacturing multiple-layer films, well known to an expert in the art, and they are also suitable for the manufacture of a multiple-layer film according to the present invention. Neither the number nor the thickness of the layers is crucial from the viewpoint of the invention, and they can be optimized for each use.

Figure 1:
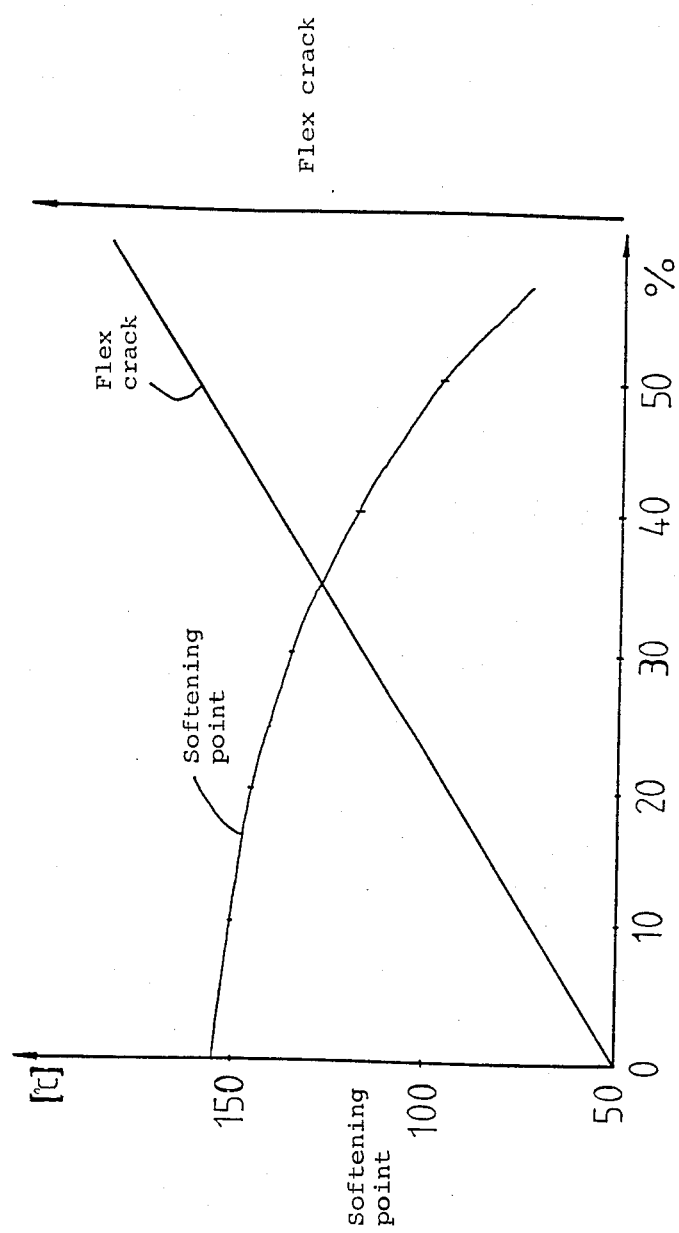
FIG. 1 depicts diagrammatically the effect of the composition of the polypropylene-elastomer mixture on the softening temperature and flex crack resistance of the mixture.
Figure 2:
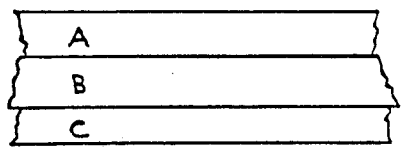
FIG. 2 depicts the cross section of one embodiment of the multiple-layer film according to the invention.

According to one preferred embodiment of the invention, a triple-layer film according to FIG. 2 is used. The outer layer (A) is heat-resistant material, e.g. polyester, its copolymer, or a heat-resistant mixture of polypropylene and an elastomer. The purpose of this layer of the film is for its part to prevent the penetration of water vapor into the package, and mainly to protect the other layers of the laminate from high temperatures. Such temperatures are present when packages are manufactured by heat-sealing, and they are about 160°–180° C., i.e. much higher than the steam-sterilization temperature.

A mixture of polypropylene and an elastomer, or a linear polyethylene, or polypropylene is used for the innermost, i.e. sealed, layer (C). When a linear polyethylene is used it is advantageous to use a quality having greater heat resistance and a density of 0.940–0.960 g/cm$^3$. Low permeability to water vapor and good heat-sealability are important among the properties of this layer. Its Vicat Softening Temperature must be high enough so that the product packaged will not adhere to the inner surface of the layer during steam-sterilization at about 120° C.

For the middle layer (B) it is possible to select a polypropylene-elastomer mixture by means of which very good mechanical properties are achieved. The heat resistance of the middle layer need not be so high as that of the outer layer. The Vicat Softening Temperature is also not so critical as in the inner layer, since the layer will not come into direct contact with the product to be packaged. This layer, in which the proportions of polypropylene and elastomer can be varied, has a crucial importance for the mechanical properties of the laminate. The toughness of the laminate can be increased by increasing the proportion of elastomer, but on the other hand the increase of elastomer increases the price of the film, and thus there is no reason to increase the elastomer proportion more than is necessary for practical purposes.

For cases requiring great elasticity it is possible to increase the proportion of elastomer so that, for example, in the middle layer the proportion of elastomer is high, the innermost layer is linear polyethylene, and the outermost layer is polyester.

Figure 3:
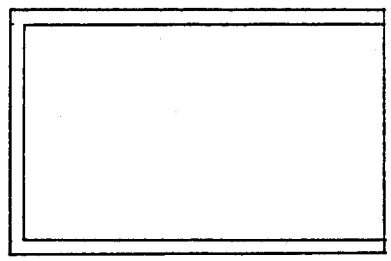
FIGS. 3 and 3A depicts one embodiment of the outer package for physiologic solutions, according to the invention.
Figure 3A:
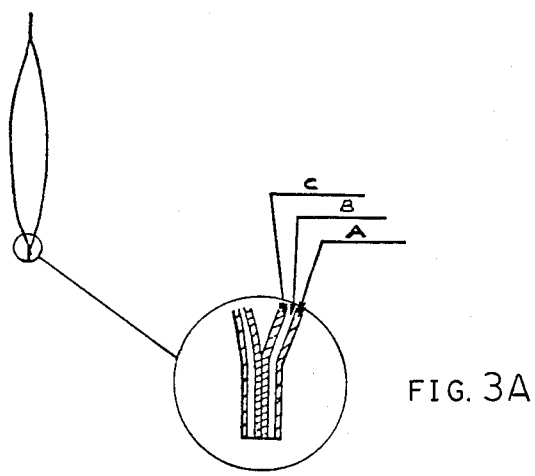
Figure 4:
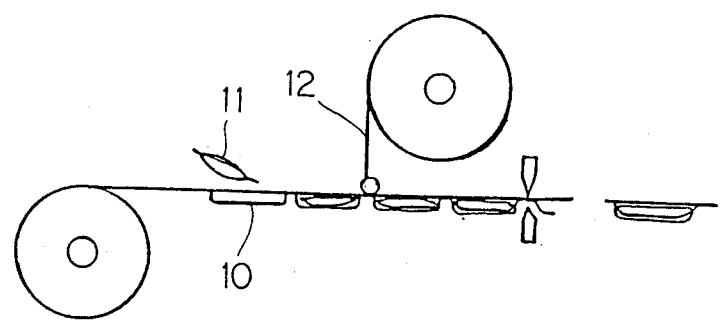
FIG. 4 depicts another embodiment of the outer package for physiologic solutions.

Before sterilization the inner package for physiologic solutions is packed in the outer package according to the invention, and air is sucked out of the outer package. The outer package may be a bag made from a multiple-layer film according to the invention, sealed on three sides (FIG. 3), or it may be a sheet of a multiple-layer film according to the invention, in which case the packaging is carried out by using a so-called deep-drawing machine (FIG. 4). In this case the multiple-layer film according to the invention is shaped into a cup 10 in which the inner package 11 for physiologic solutions is placed, whereafter the upper sheet 12 made of a multiple-layer film according to the invention is heat-sealed to the lower sheet.

Experiment

The following experiment was carried out on films according to the invention in order to test their heat-sterilizability and their mechanical properties. The elastomer was Esso's ethylene-vinyl acetate elastomer Ex 233.

First, four flat films according to the invention were prepared by a conventional lamination technique; the structures of the films were as follows (layers, see FIG. 2):

TABLE 2

| | Film 1 according to the invention: | |
|---|---|---|
| Layer | Material | Thickness, μm |
| A | polyester | 30 |
| B | PP-elastomer mixture | 100 |
| C | PP | 38 |

TABLE 3

| | Film 2* according to the invention: | |
|---|---|---|
| Layer | Material | Thickness, μm |
| A | polyester | 30 |
| C | PP-elastomer mixture | 100 |

TABLE 4

| | Film 3 according to the invention: | |
|---|---|---|
| Layer | Material | Thickness, μm |
| A | oriented polyester | 12 |
| B | PP-elastomer mixture | 70 |
| C | PP | 38 |

TABLE 5

| | Film 4* according to the invention: | |
|---|---|---|
| Layer | Material | Thickness, μm |
| A | oriented polyester | 12 |
| C | PP-elastomer mixture | 70 |

Then two films according to the state of the art, with the following structures, were prepared by the lamination technique:

TABLE 6

| | Film 1 according to the state of the art: | |
|---|---|---|
| Layer | Material | Thickness, μm |
| A | polyester | 30 |
| C | PP | 75 |

TABLE 7

| | Film 2* according to the state of the art: | |
|---|---|---|
| Layer | Material | Thickness, μm |
| A | PA | 50 |
| C | PP | 75 |

The asterisk (*) indicates a double-layer film.

Figure 6:
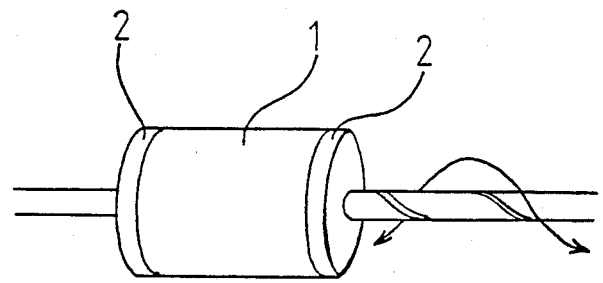
FIGS. 5 and 6 depicts the Flex-Crack apparatus of Wipak Oy.
Figure 5:
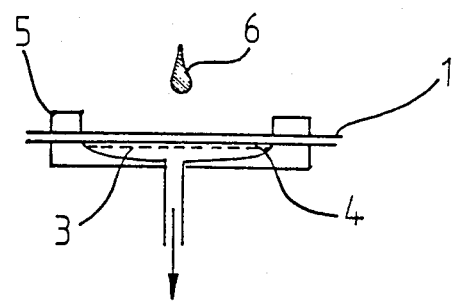

Wipak Oy's Flex-Crack test was performed on these films according to the invention and according to the state of the art, having normal permeability to gases and water vapor; the test was performed in the following manner (see FIGS. 5 and 6):

Film layer 1 is secured to two parallel rings 2 in such a way that it forms a cylindrical surface (FIG. 6). One of the rings is then brought towards the other ring by a helical movement, at which time it also rotates, wrinkling the plastic film helically. Thereafter the movement takes place back to the initial position. The duration of one sequence is about 1 s, and the duration of the whole test is about 20 min. After the test, blotting paper 4 (FIG. 5) is placed on a horizontal, porous board 3 evacuatable from below, on top of it is placed the film 1 just treated, and they are pressed by means of ring 5 tightly against the porous board 3. After evacuation, a drop of colored liquid 6 is dropped on the film surface, whereupon the liquid quickly passes through any holes in the film. By counting the number of colored stains in the blotting paper the number of holes in the film is obtained, which is a measure of the damage caused to the film by the mechanical treatment.

The results are shown in Table 8.

TABLE 8

| | The results were: | |
|---|---|---|
| Multiple-layer film | Before sterilization | After sterilization |
| multiple-layer films according to the invention | 0–50 holes/m² | 20–90 holes/m² |
| polyester/PP multiple-layer film | about 400 holes/m² | about 400 holes/m² |
| PA/PP multiple-layer film | about 200 holes/m² | about 350 holes/m² |

The experiment shows that the film according to the invention are mechanically superior compared with films intended for the same purpose, and that these excellent mechanical properties are retained also after steam-sterilization. Thus the films according to the invention are very suitable for sterilized and heat-sealed packages for physiologic solutions.

I claim:

1. A strong and steam-sterilizable multiple-layer plastic film for packaging physiologic solutions comprising an outer layer formed from a material selected from the group consisting of polyester, polyester copolymer, polyolefin, and polyamide, and an inner layer formed from a mixture of polypropylene and ethylene-vinyl acetate elastomer wherein said multiple-layer plastic film is capable of being steam-sterilized at a temperature of at least 120° C. and maintains its mechanical properties after steam-sterilization.

2. The multiple-layer plastic film of claim 1 wherein said mixture of polypropylene and ethylene-vinyl acetate elastomer contains, by weight of the mixture, about 10–60% elastomer.

3. The multiple-layer plastic film of claim 2 wherein said mixture of polypropylene and ethylene-vinyl acetate elastomer contains, by weight of the mixture, about 20–50% elastomer.

4. The multiple-layer plastic film of claim 1 wherein said outer layer is formed from a linear polyethylene.

5. The multiple-layer plastic film of claim 4 wherein said linear polyethylene has a density of about 0.940–0.960 g/cm³.

6. The multiple-layer plastic film of claim 1 wherein said outer layer is formed from an oriented polyester.

7. The multiple-layer plastic film of claim 1 wherein said outer layer is formed from polypropylene.

8. The multiple-layer plastic film of claim 1 which additionally comprises an innermost layer situated so that the inner layer is interposed between said innermost and outer layers and said innermost layer is formed from a polyolefin.

9. A strong and sterilizable plastic package for physiologic solutions comprising a multiple-layer plastic film having an outer layer formed from a material selected from the group consisting of polyester, polyester copolymer, polyolefin, and polyamide, and an inner layer formed from a mixture of polypropylene and ethylene-vinyl acetate elastomer wherein said plastic package is capable of being steam-sterilized at a temperature of at least 120° C. and maintains its mechanical properties after steam-sterilization.

10. The plastic package of claim 9 wherein said mixture of polypropylene and ethylene-vinyl acetate elastomer contains, by weight of the mixture, about 10–60% elastomer.

11. The plastic package of claim 10 wherein said mixture of polypropylene and ethylene-vinyl acetate elastomer contains, by weight of the mixture, about 20–50% elastomer.

12. The plastic package of claim 9 wherein said outer layer is formed from a linear polyethylene.

13. The plastic package of claim 12 wherein said linear polyethylene has a density of about 0.940–0.960 g/cm$^3$.

14. The plastic package of claim 9 wherein said outer layer is formed from an oriented polyester.

15. The plastic package of claim 9 wherein said outer layer is formed from polypropylene.

16. The plastic package of claim 9 wherein the connection units of said package are formed from a mixture of polypropylene and ethylene-vinyl acetate elastomer.

17. The plastic package of claim 9 which additionally comprises an innermost layer situated so that the inner layer is interposed between said innermost and outer layers and said innermost layer is formed from polyolefin.

* * * * *